Figure 1:
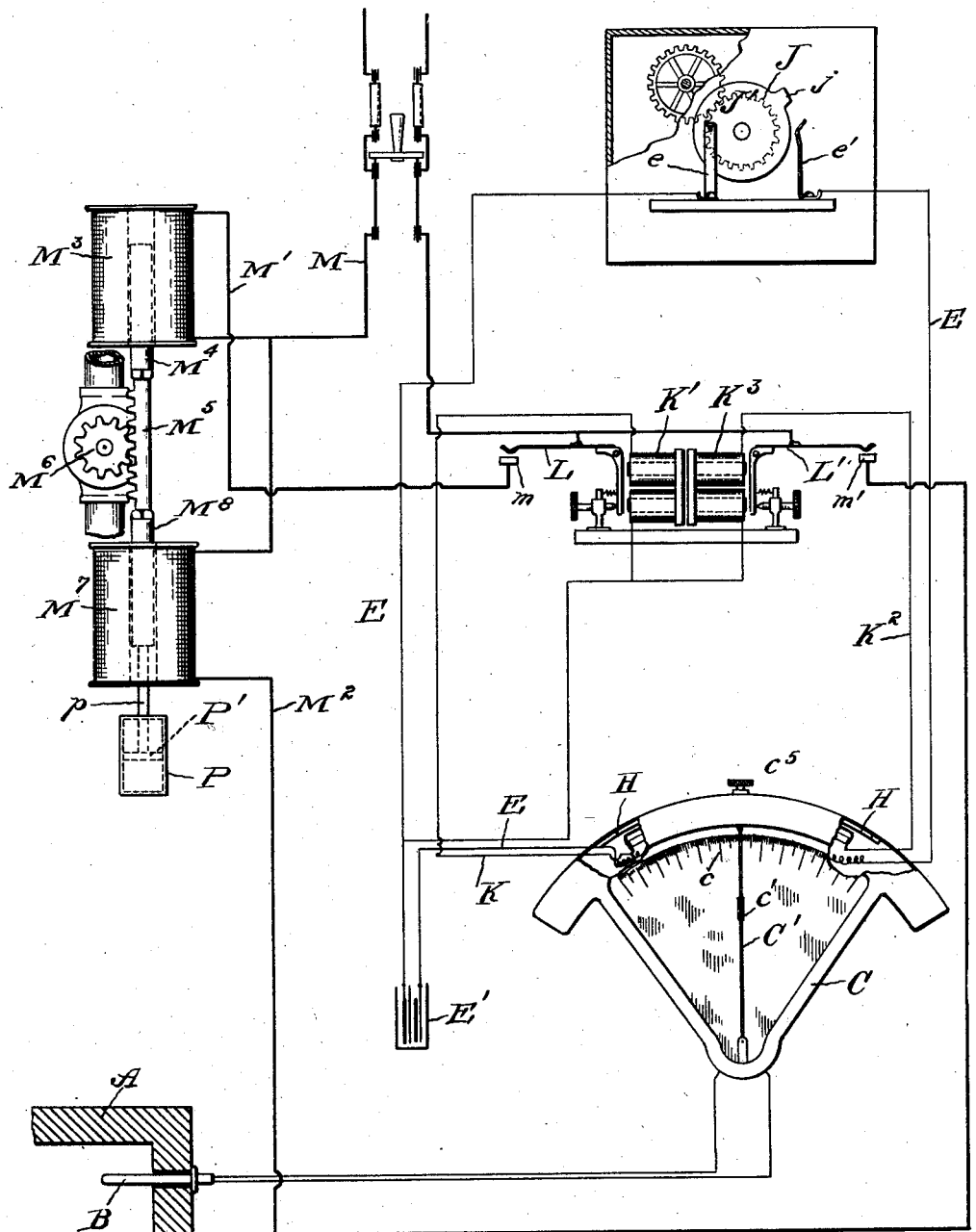

R. E. BAKER.
APPARATUS FOR REGULATING THE TEMPERATURE OF FURNACES AND THE LIKE.
APPLICATION FILED NOV. 25, 1912.
1,170,727.
Patented Feb. 8, 1916.
3 SHEETS—SHEET 2.
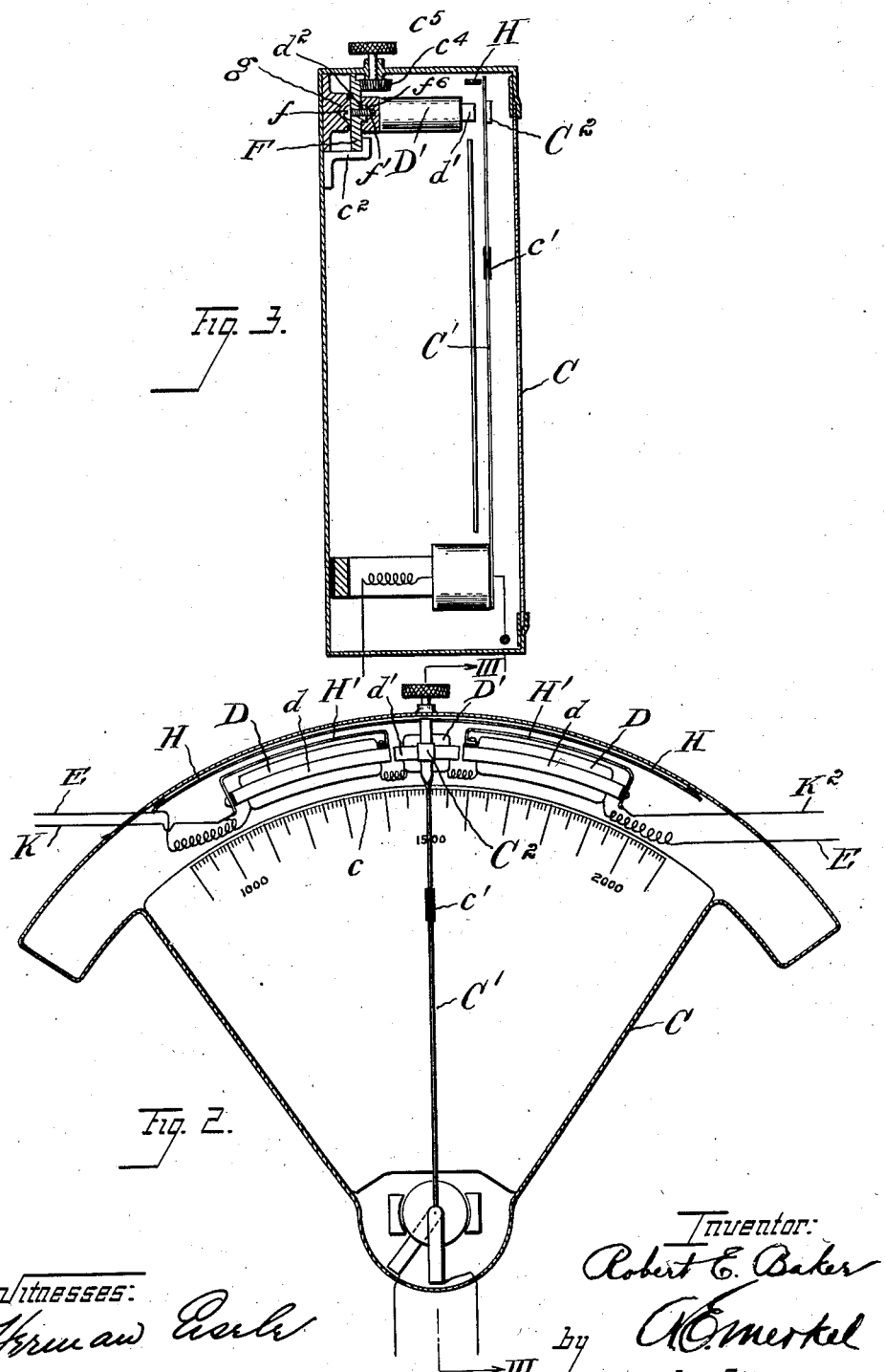

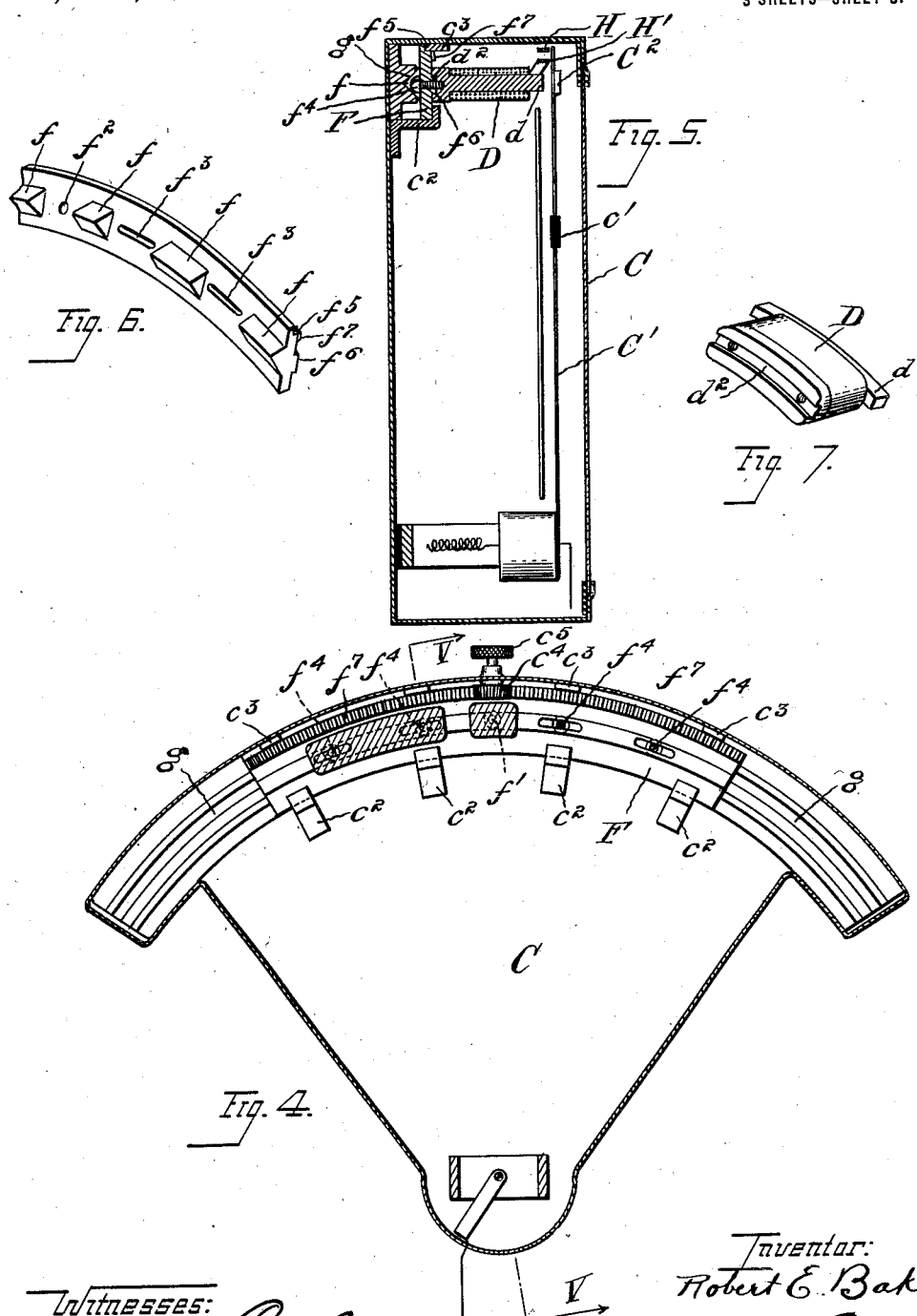

UNITED STATES PATENT OFFICE.

ROBERT E. BAKER, OF CLEVELAND, OHIO, ASSIGNOR TO ARTHUR G. McKEE.

APPARATUS FOR REGULATING THE TEMPERATURE OF FURNACES AND THE LIKE.

1,170,727. Specification of Letters Patent. Patented Feb. 8, 1916.

Application filed November 25, 1912. Serial No. 733,459.

*To all whom it may concern:*

Be it known that I, ROBERT E. BAKER, a citizen of the United States, resident of Cleveland, county of Cuyahoga, and State of Ohio, have invented a new and useful Improvement in Apparatus for Regulating the Temperature of Furnaces and the like, of which the following is a specification, the principle of the invention being herein explained and the best mode in which I have contemplated applying that principle, so as to distinguish it from other inventions.

My invention relates to apparatus for regulating the temperature of furnaces, crucibles, or other receptacles or objects whose temperature it is desired to measure and control.

The object of the invention is to provide means to automatically maintain the temperature of such furnace, crucible, other receptacle or object, within certain predetermined limits.

The said invention consists of means hereinafter fully described and particularly set forth in the claims.

The annexed drawings and the following description set forth in detail certain means embodying my invention, the described means, however, constituting but one of various mechanical forms in which the principle of the invention may be applied.

In said annexed drawings:—Figure 1 is a diagrammatic illustration of an apparatus embodying my invention. Fig. 2 is a plan of a galvanometer embodied in my invention. Fig. 3 is a section of such galvanometer taken upon the plane indicated by line III—III in Fig. 2. Fig. 4 is a horizontal section of such galvanometer. Fig. 5 is a section of such galvanometer taken upon the plane indicated by line V—V in Fig. 4. Fig. 6 is a perspective view of a fragmentary portion of the galvanometer. Fig. 7 is a perspective view of one of the magnets embodied in such galvanometer.

Certain features of the described and illustrated apparatus are, however, shown, described and claimed in a separate application for Letters Patent, said application bearing Serial No. 842,536, and having been filed June 2, 1914.

In the apparatus illustrated by the drawings as embodying my invention, A, Fig. 1, represents a furnace or crucible whose temperature it is desired to measure and control. Projecting into this furnace or crucible at a suitable place is an ordinary thermocouple B connected with the galvanometer C in the usual manner, so that a variation of temperature in the furnace, will effect a deflection of the indicating pointer or needle $C'$ of the galvanometer. The latter is provided with the usual graduations $c$. The outer end of the needle consists of a non-magnetic material, preferably a metal such as aluminum, and, where the balance of the needle is also of aluminum or a similar conducting material, is insulated therefrom by means of suitable insulation $c'$. This outer portion of the needle carries a small armature $C^2$ which hence has a path of movement defined by the arc of a circle, as will be readily understood. Adjacent to the armature's path of movement and having their end faces parallel with such path, are the cores $d\ d$ and $d'$ of three magnets D D and D' respectively. The coils of these magnets are connected in series in an electrical circuit E containing a battery $E'$, Fig. 1.

In the specific form of device illustrated, the faces of the cores $d\ d$ are made equal in length and each of such faces is made of suitably greater length than the face of the core $d'$, the latter being equally spaced laterally from said first named two core-faces, as shown in Fig. 2. Each of these three magnets is mounted upon a segmental bar F, Fig. 4, which itself is provided with a multiplicity of spaced guiding lugs $f$, Fig. 6, which travel in a segmental groove $g$, Figs. 4 and 5, formed in the frame of the galvanometer. The magnet D' is removably secured to the bar or carrier F by means of a suitable screw $f'$, Fig. 3, passing through a circular aperture $f^2$, Fig. 6, located between two of the guiding lugs $f$, whereby it is seen that the magnet may be readily removed and replaced by a second magnet. Laterally of the said aperture $f^2$ and also located between adjacent lugs $f$ are elongated slots $f^3$ through which pass screws $f^4$ securing magnets D D to said bar. By means of these elongated slots it will be seen that the position of these last two named magnets may be adjusted longitudinally of the bar, with reference to each other and to the central or intermediate magnet D', such adjustment being limited by the length of the elongated openings or slots $f^3$ as will be readily understood. The fastening screws all are threaded into the inner end of the cores of the magnets as shown, and such inner ends are formed with segmental grooves $d^2$, Fig. 7, which engage a segmental tongue $f^6$, Fig. 5, by means of which construction it will be seen that the magnets may be accurately positioned as well as retained upon the carrier or bar F.

The bar or carrier F is retained in position by means of suitable brackets $c^2$, Figs. 3, 4 and 5, which engage one edge thereof, and a strip $c^3$, Fig. 5 which engages a groove $f^5$ formed adjacent to the other edge of the bar. The latter is furthermore formed near its outer and upper edge with bevel-gear teeth $f^7$ which are engaged by a bevel-pinion $c^4$ suitably mounted and operable through the medium of a thumb-wheel $c^5$ projecting from the outer portion of the galvanometer's casing. It will therefore be seen that by turning the thumb-wheel $c^5$ the carrier F together with all of the magnets may be simultaneously shifted in a direction parallel with the path of movement of the small armature $C^2$. The magnetic field which is set up by these magnets is therefore intersected by the path of movement of said armature, and is also shiftable in the direction of movement of the latter.

Suitably mounted and fixed to the galvanometer's casing is a segmental contact strip H having its upper or contact surface parallel with the path of movement of the outer end of the galvanometer needle and placed in a position such that the movement of the armature $C^2$ toward any one of the magnet cores, will effect contact between the outer end of the needle and such surface. This contact strip is of a length sufficient to effect such contact in all positions into which the carrier F and magnets mounted thereon may be shifted.

Mounted upon each of the cores $d$ $d$ of magnets D D, is a contact strip, H' H', having an outer segmental contact surface coextensive as to length with the outer face of the core, such surface being located in the plane of the contact surface of the strip H. These two strips form an auxiliary, interrupted and elongated contact surface which is also capable of being engaged by the end of the needle C', when subjected to movement as a result of the attraction of the armature $C^2$. Such action, it will therefore be observed, will result in the electrical connection of the continuous contact surface of the strip H and an interrupted contact surface formed by the strips H' H', when the needle C' is opposite either of the magnets D D. When the needle is opposite the magnet D', the contact strip H alone will be engaged by the said needle.

The contact strip H forms a terminal in the circuit E as shown in Fig. 1. This circuit contains a circuit breaker J adapted to periodically make and break same at predetermined intervals. This circuit breaker may be of any suitable construction, but as illustrated embodies a circular disk J' rotated at a uniform rate of speed by any suitable mechanical or other means (not shown) and which is constantly engaged by the resilient terminal $e$ in the circuit E. A second resilient terminal $e'$ also in said circuit, lies in the path of a projection $j$ formed upon the disk, the length of the engaging surface of this projection being such as to produce the required period of contact and hence of completion of the circuit E. From the construction as thus far described it will be seen that at predetermined intervals the circuit E will be completed for a predetermined length of time, armature $C^2$ attracted and the terminal strips H and H' connected, at such times when the needle is opposite the magnets D D. When the needle is opposite the magnet D' and the circuit E is likewise periodically completed, the armature is attracted but only the contact strip H engaged.

The one terminal strip H' is connected with a circuit K, Fig. 1, including the coils of a magnet K' adapted to operate a relay switch L. This circuit K also contains the battery E'. The other contact strip H' is connected with a circuit $K^2$ including the coils of a second magnet $K^3$ adapted to operate a second relay switch L'. This circuit $K^2$ also contains the battery E'.

A main feed or supply circuit M is provided and connected therewith are two parallel circuits M' and $M^2$ containing respectively the terminals $m$ and $m'$ with which the relay switches L and L' are normally out of engagement but adapted to engage when the respective magnets K' and $K^3$ are energized. The circuit M' contains the coil of a solenoid $M^3$ whose core $M^4$ is connected with a rack $M^5$. This rack engages a pinion $M^6$ connected in any suitable manner with a valve, damper or any other device (not shown) capable of controlling the temperature of the furnace or the like, such device being, as will be readily understood by those skilled in the art, suitably located for this purpose. The other parallel circuit $M^2$ contains the coil of a second solenoid $M^7$, coaxial with solenoid $M^3$ and whose core $M^8$ is connected to the other end of the rack $M^5$. When the solenoid $M^3$ is energized, the rack is drawn in one direction to operate the valve to increase the temperature of the furnace and when the solenoid $M^7$ is energized the opposite movement is effected to produce a decrease of such temperature. A suitable dash-pot P is provided in which operates a piston P' connected with the solenoid-core $M^8$ through the medium of a suitable piston-rod $p$. As will be understood this dash-pot is provided in order to arrest and control the movement of the solenoid cores.

The above described device operates as follows:—Let it be assumed that it is desired to maintain a temperature of the furnace between certain limits. The carrier F is moved so that the intermediate magnet D' subtends an arc including the graduations whose extreme members define such limitations of temperature. This position is imparted by turning the thumb-wheel $c^5$ as previously described. Let it now be assumed that the temperature of the furnace is of a degree less than the minimum temperature which it is desired to maintain. The needle of the galvanometer therefore will be opposite say the left-hand magnet D. The disk J' revolving about its axis at a given period closes the circuit E, whereby the magnets D D and D' become energized, the armature $C^2$ is attracted, the contact strips H and the corresponding contact strip H' are connected, thus closing the circuit K. This action energizes the magnet K' which thereupon effects the movement of its armature connected with relay switch L. This movement brings this switch into contact with the terminal $m$ and closes the circuits M and M', the circuit $M^2$ remaining open as a result of the non-engagement of the terminal $m'$ and switch L'. As a result, solenoid $M^3$ is energized and the valve or other device operated to increase the temperature of the furnace. As a consequence the needle of the galvanometer advances to indicate the temperature thus produced. Successive increases of temperature are in a like manner produced until the temperature reaches a point beyond the minimum temperature desired. When this occurs the needle reaches a position opposite the intermediate magnet D' and in the subsequent closing of the circuit E becomes inoperative in so far as concerns the closing of the circuit K and hence the operation of the valve or temperature controlling device. Should now for any reason or combination of circumstances, the temperature of the furnace rise above the maximum temperature desired, the needle reaches a position opposite the other of the magnets D. In this event the periodic closing of the circuit E closes the circuit $K^2$ causing the switch L' to engage terminal $m'$ and close the circuits M and $M^2$. This results in the energizing of the solenoid $M^7$ and the opposite movement of the valve or temperature controlling device, as will be readily understood. In this manner it will be seen that the temperature of the furnace may be automatically controlled so as to maintain same within certain specific and predetermined limits. If it is desired to change these limits the intermediate magnet C' is removed and a magnet substituted therefor having a core of different width, the magnets D D being adjusted upon the carriage F correspondingly.

Having fully described my invention, what I claim and desire to secure by Letters Patent is:—

1. In apparatus for regulating the temperature of furnaces or the like, the combination of means for varying the temperature of said furnace or the like; electrical means for controlling the operation of said temperature-varying means; electrical means for controlling the first-named controlling-means; and separate electrical means for recurrently completing a circuit in said last-named controlling means, at predetermined periods of time.

2. In apparatus for regulating the temperature of furnaces or the like, the combination of means for varying the temperature of said furnace or the like; electrical means for controlling the operation of said temperature-varying means; electrical means for controlling the first-named controlling-means; and separate electrical means for recurrently completing a circuit in said last-named controlling-means and independently of temperature.

3. In apparatus for regulating the temperature of furnaces or the like, the combination of a temperature-indicator; means for varying the temperature of said furnace or the like and including a source of motive-power; and means for controlling said source of power and including an electrical circuit controlling a magnetic field and means for interrupting such circuit periodically, and a second electrical circuit directly controlling said controlling means and including a circuit-closing member carried by the indicating member of said indicator and located in said magnetic field.

4. In apparatus for regulating the temperature of furnaces or the like, the combination of a temperature-indicator; means for varying the temperature of said furnace or the like and including a source of motive-power; and means for controlling said source of power and including an electrical circuit controlling a magnetic field and means for interrupting such circuit periodically; and a second electrical circuit directly controlling said controlling means and including a circuit-closing member controlled by the indicating member of said indicator and located in said magnetic field.

5. In apparatus for regulating the temperature of furnaces or the like, the combination of a thermo-couple; a galvanometer electrically connected with and operated by said thermo-couple; means for regularly and periodically completing an electric circuit through the needle of said galvanometer; a magnetically operated switch controlled through said electric circuit; a valve; and means for controlling the movements of said valve, through said magnetically operated switch.

6. In apparatus for regulating the temperature of furnaces or the like, the combination of a thermo-couple; a galvanometer electrically connected with said thermo-couple; a system of electro-magnets; means for regularly and intermittently energizing said magnets; means for completing an electric circuit through the needle of said galvanometer by attraction of said needle by said magnets; an electric current switch operated through the closing of said electric circuit; and a magnetically operated valve controlled by said electric current switch.

7. In apparatus for regulating the temperature of furnaces or the like, the combination of a thermo-couple; a galvanometer electrically connected with said thermo-couple; a series of electric magnets located beneath the plane of the needle of said galvanometer; means for moving said magnets in a parallel plane with said needle-plane; means for intermitently energizing said magnets; a magnetically operated electric current switch; means for operating and controlling said electric current switch through an electric current controlled by said galvanometer and electro-magnets; and a valve magnetically operated and controlled by said electric current switch.

8. In apparatus for regulating the temperature of furnaces or the like, the combination of an electrically operated pyrometer; a series of electro-magnets located beneath the plane of the needle of the indicating instrument of said pyrometer; means for energizing said magnets at controllable time intervals; means for changing the position of said magnets; an electric current switch electrically operated and controlled through closing of an electric circuit upon attraction of said needle by said electro-magnets; a valve; and operating means for said valve controllable through the operation of said electric current switch.

9. In apparatus for regulating the temperature of furnaces or the like, the combination of a thermo-couple an electrical current indicating instrument electrically connected with said thermo-couple; a series of electro-magnets; means for intermitently energizing said electro-magnets; an armature attached to the needle of said indicating instrument and so located as to be attracted by said electro-magnets, contacts of opposite polarity so located as to be connected by said needle when attracted by said electro-magnets; an electric current switch electrically controlled and operated by the closing of an electric circuit upon connections of said contacts by said needle; a valve, and electrical operating means for said valve, controllable through the operation of said electric current switch.

Signed by me, this 22d day of November, 1912.

ROBERT E. BAKER.

Attested by—
WM. R. MILLER,
D. FINDLING.